F. GOTTSCHALK.
TELEPHONE TRANSMITTER.
APPLICATION FILED JAN. 29, 1910.
977,616.
Patented Dec. 6, 1910.
2 SHEETS—SHEET 1.
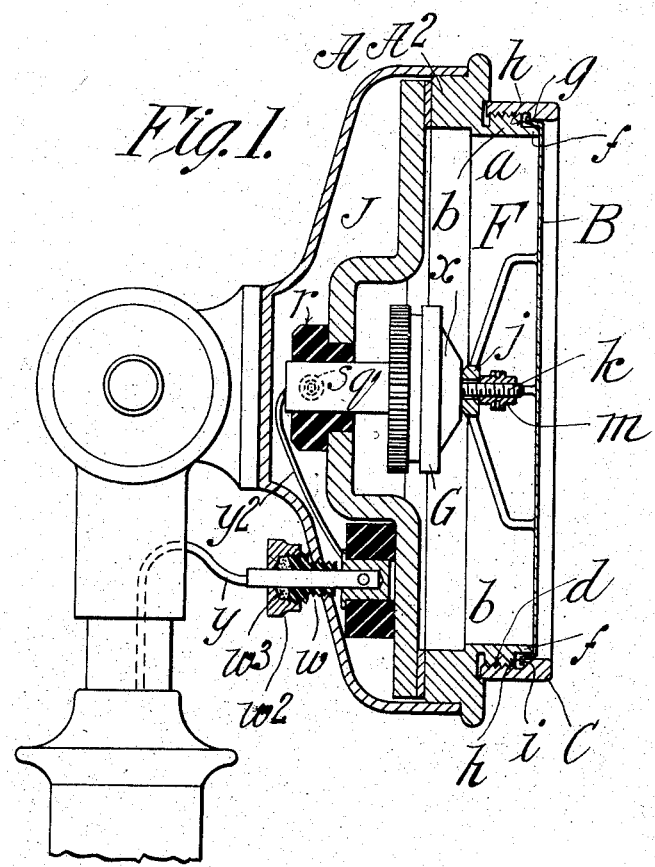
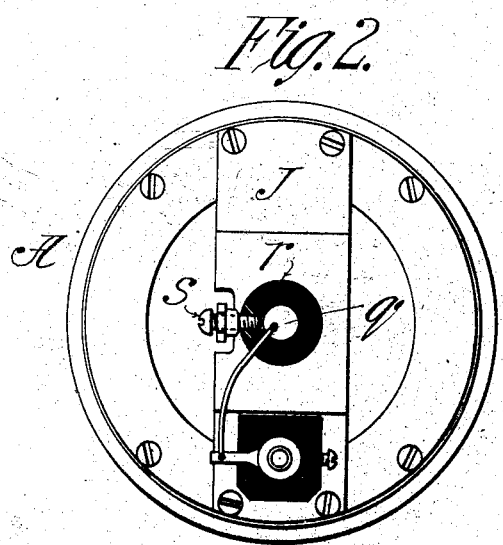
WITNESSES:
INVENTOR,
Felix Gottschalk,
BY
ATTORNEY.

F. GOTTSCHALK.
TELEPHONE TRANSMITTER.
APPLICATION FILED JAN. 29, 1910.
977,616.
Patented Dec. 6, 1910.
2 SHEETS—SHEET 2.
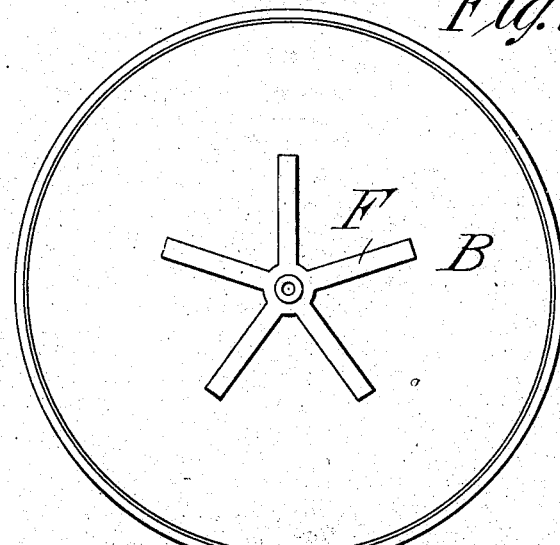
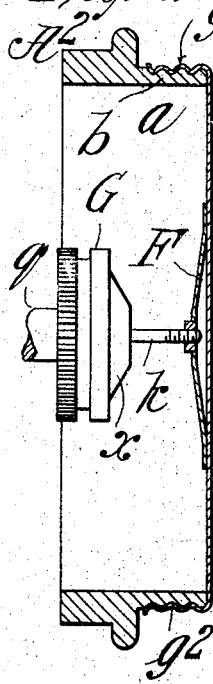
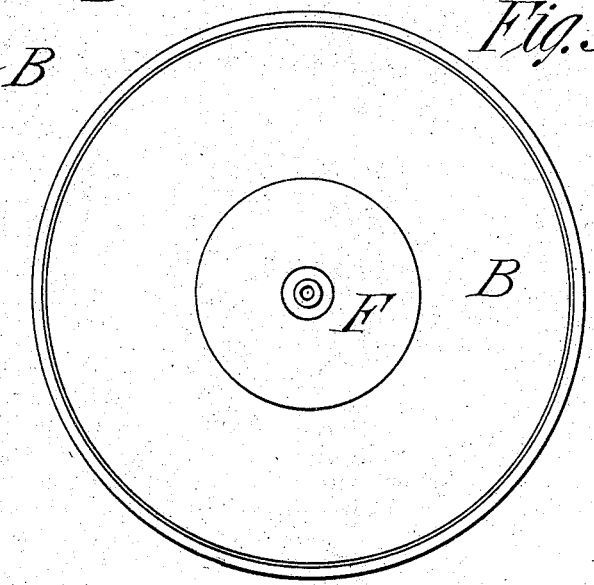
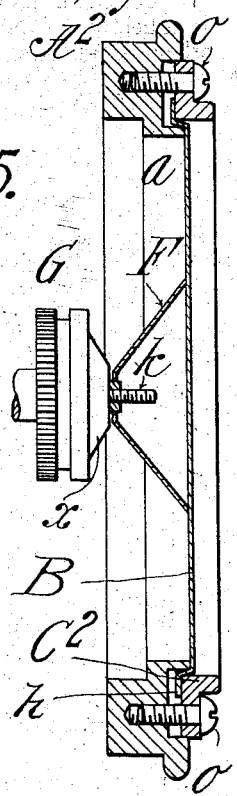
WITNESSES:
INVENTOR,
Felix Gottschalk,
BY
ATTORNEY.

UNITED STATES PATENT OFFICE.

FELIX GOTTSCHALK, OF NEW YORK, N. Y.

TELEPHONE-TRANSMITTER.

977,616.  Specification of Letters Patent.  Patented Dec. 6, 1910.

Application filed January 29, 1910. Serial No. 540,747. REISSUED

*To all whom it may concern:*

Be it known that I, FELIX GOTTSCHALK, a citizen of the United States of America, and resident of New York, in the county of New York and State of New York, have invented certain new and useful Improvements in Telephone-Transmitters, of which the following is a full, clear, and exact description.

The invention relates to improvements in telephonic instruments which are applicable on transmitters and also receivers of the Bell type now in very extensive use, and also in electric instruments in other types.

One of the objects is to so construct and mount the diaphragm at the front of the instrument that the usually employed forwardly flaring mouthpiece which constitutes a collector of germs, dust, moisture and other impurities, is done away with and whereby the front of the instrument is closed, with the resultant advantage that neither moisture, dust, or any fine particles can find entrance into the interior of the instrument to impair the operation thereof.

The instrument is, under the exercise of this invention, one which is entirely sanitary with, furthermore, the susceptibility of being always so maintained.

Further objects of the invention are to improve the operative character of the diaphragm and the efficiency of the same in its coöperation with the resistance cup including the usual electrodes and interposed granular carbon and to render it practicable to adjust and maintain the instrument in adjustment and to generally simplify the transmitter.

The invention consists in the combination or arrangement of parts and the constructions of certain of the parts substantially as hereinafter described in conjunction with the accompanying drawings and set forth in the claims.

In the drawings:—Figure 1 is substantially a central vertical sectional view, on an enlarged scale, from front to rear through the improved telephone transmitter; Fig. 2 is a view at the rear of the instrument, on a somewhat smaller scale than Fig. 1,—the inclosing casing being understood as removed. Figs. 3 and 4 are partial central vertical sectional views, on an enlarged scale, showing constructions which while somewhat modified from those represented in Fig. 1 are under and in accordance with this invention. Figs. 5 and 6 are respectively a rear face view and a cross section of the diaphragm of the form represented in Fig. 3, while Figs. 7 and 8 are respectively a rear face view and a central cross section of the form of the diaphragm represented in Fig. 4.

The same or similar characters of reference denote the same or resembling parts in the several views.

More especially referring to Fig. 1: In the drawings, A represents a metallic casing of the transmitter having a circular aperture $a$ through the separable annular casing portion or section $A^2$; and the said casing, in the section $A^2$ thereof, is provided with a forwardly extending annular rib $b$ provided circumferentially in the rear portion thereof with screw threads $d$ and having a rabbeted forward portion $f$. B represents the diaphragm of a larger size than usually employed, spanning and forming a drum-head closure for the aperture $a$ in the front of the casing, the portion of the diaphragm near its margin extending across the front edge of the aforementioned rib $f$ and has the rearwardly turned portion $g$ embracing and more or less closely fitting the rabbeted portion $f$ of the rib and having an outturned marginal portion $h$. C represents a confining and tensioning ring internally screw threaded in its rearward portion and having an intermediate annular shoulder $i$ which engages the outturned marginal portion of the diaphragm. By screwing the ring C more or less far in a rearward direction on the screw threaded annular rib which margins and extends forwardly from the aperture through the front of the telephone casing, the thin metal diaphragm may be drawn taut and maintained under a most desirable degree of tension for a maximum of efficiency in the vibratory action of the uniformly strained or stretched diaphragm. The diaphragm has a member F supported at its rear side and unitary therewith which rearwardly extends to contact or engagement with the front electrode $x$ comprised as usual in the resistance cup G.

As shown in Fig. 1, this member F is a spider or skeleton frame, the legs or members of which are rearwardly divergent and centrally joined by a hub $j$ having an aperture axially therethrough, through which aperture protrudes the stem or stud $k$ formed as a part of, supported by, and forwardly projecting from the front electrode, and the nut $m$ screwing on the said stud, having its location between the rear of the diaphragm and the front face of the hub $j$ serves to insure a contacting, with the required degree of delicacy of the rearwardly extending member or substantially integral appurtenance F of the diaphragm against the electrode.

As represented in Figs. 3, 5 and 6, the member F formed as one with, and rearwardly extended from, the drum head diaphragm is made in the form of a comparatively deep cone which is rearwardly divergent, and, by its oblated or truncated portion at its rear end which is formed with an aperture, is engaged over the stud $k$ which projects forwardly beyond the front electrode $x$ of the resistance cup. In Fig. 3 the out-turned portion $h$ of the diaphragm is engaged by the ring $C^2$ which instead of screw engaging the apertured front part $A^2$ of the casing is connected thereto by the binding screws $o$ $o$.

As represented in Figs. 4, 7 and 8, the drum head diaphragm B has its rearwardly located substantially integral member F made in the form of a comparatively shallow sheet metal spider, the apertured central portion of which has a screw engagement with the stud $k$ forwardly projecting from the front electrode of the resistance cup;—it being possible by reason of the bodily adjustment of the resistance cup in a forward and rearward direction to secure the screw engagement of the appurtenance F of the diaphragm with the screw stud $k$, which, to all intents and purposes, in this instance is a part of the front electrode $x$.

The resistance cup, as represented in Figs. 1 and 2, has its rearwardly projecting stem $q$ fitted through an insulating bushing $r$ in the bridge J and held in its adjusted confinement by the binding screw $s$. The screw engagement between the rearwardly located member F of the diaphragm B and the screw stud or the electrode having been effected and the diaphragm tensioned on the forwardly projecting rib $b$ of the apertured casing, it is entirely practicable to secure the adjustment of the instrument to accord with the properly positioned and tensioned diaphragm by moving the resistance cup forwardly and rearwardly through the insulating bushing piece $r$ at the rear central portion of the bridge. Inasmuch as the diaphragm is in metallic contact with the metallic casing A, $A^2$, it is expedient in this improved telephone to have the telephone wire $y$ in metallic connection by the extension wire $y^2$ with the metallic stem $q$ of the resistance cup understood as in communication with the rear electrode instead of, as heretofore most usual, having such wire $y^2$ in connection with the front electrode on account of the front electrode being in metallic connection with the casing.

In the representation of the diaphragm, Fig. 4, the means for its supporting engagement with, and for its tensioning on, the forwardly extending rib $b$ of the casing section $A^2$, consists in the rearwardly turned screw threaded portion $g^2$ of the diaphragm and the externally screw threaded formations of the rib,—the effect being that when the diaphragm is turned up so that its face portion engages the front edge of the rib $a$ then further rotative movement of the diaphragm will result in the straining or stretching of it to its suitably taut condition, owing to the more or less flexible nature of the very thin spun-up or otherwise produced diaphragm having the screw threaded rib engaging flange.

The ring C, Fig. 1, or $C^2$, Fig. 3, is represented as having a portion thereof provided so as to protrude forwardly beyond the plane of the diaphragm, such portion constituting a guard and protector to the diaphragm for saving it from becoming indented or distorted in case the telephone instrument should be overturned or fall accidentally.

The portion of the invention comprising the front aperture casing having a rib marginally of its aperture in combination with the diaphragm having a rearwardly turned and outwardly turned marginal portion and a ring applied on the said rib and engaging the outturned portion of the diaphragm is as well applicable on a telephone receiver as on a transmitter; and the employment thereof in either situation is to be considered within the scope of this invention.

It will be apparent from the foregoing description and the illustrations therewith provided that this instrument is one of extreme simplicity and economical construction, that it is absolutely closed at its front and possesses the advantage in addition to being entirely sanitary and germ-proof, of also excluding all moisture, dust and foreign matter from the interior of the casing; and yet the parts may be easily and quickly separated as any occasion for replacement or repair may require.

In addition to making the casing of the instrument air and moisture tight at the front, the instrument is also rendered air and moisture tight at the rear by the provision of a closure for the opening through which the transmitter wire $y$ leads into the casing.

The tubular bushing $w$ in the rear of the casing is provided with a screw threaded outer end portion on which an annular cap $w^2$ is screw engaged, this cap having between its inner wall and the outer end of the bushing a rotary or other compressible packing ring $w^3$ with the effect that the screwing of the cap more or less nearly home will compress the packing tightly about the terminal and exclude the entrance of air or moisture into the instrument at its rear.

I claim:—

1. In a telephone transmitter, the combination with the casing, having an apertured front, and a resistance cup comprising a front electrode, of a diaphragm, mounted in a stretched condition between and connected with the portion of the casing marginally of its aperture, and provided at its rear side with a member, connected therewith between its vibratory center portion and its casing-engaging marginal portion, and which has a rearwardly converging formation and being by its rear attenuated portion in contact with the front electrode.

2. In a telephone transmitter, in combination, a casing, having a resistance cup therewithin including a front electrode, and said casing having a rib marginally of its aperture, of a diaphragm spanning and completely closing the aperture and extending across the edge of said rib, a ring having a screw-engagement with said annular rib and operative to confine the diaphragm in a taut condition at the front of the casing, and a member connected with and supported by the rear of the diaphragm between its center and supported marginal portion and rearwardly extending therefrom to contact with the front electrode.

3. In a telephone transmitter, in combination, a casing having a resistance cup therewithin including a front electrode and said casing having a forwardly extending annular rib marginally of its aperture, of a diaphragm spanning the aperture and extending across the front edge of said rib, having a portion rearwardly turned to overlie the periphery of the rib, and having an outturned marginal portion, and a ring having a screw engagement with said annular rib and having a portion to engage the outturned portion of the diaphragm, and a member connected with and supported by the rear of the diaphragm, and in contact with the front electrode.

4. In a telephone transmitter, in combination, a casing, having a circular aperture through its front and provided marginally of said aperture with a forwardly extending annular rib provided circumferentially in the rear portion thereof with screw threads and having a rabbeted forward portion, a diaphragm spanning and closing the aperture in the casing extending across the front edge of said rib having the rearwardly turned portion embracing the rabbeted portion of the rib and having an outturned marginal portion, a confining and tensioning ring internally screw-threaded in its rearward portion and having an intermediate annular shoulder engaging the out-turned marginal portion of the diaphragm, and a resistance cup, mounted in the casing, including the front electrode with which the diaphragm has a vibratory coaction.

5. In a telephone transmitter, the combination with a casing having a rib margined aperture through its front and having therewithin a resistance cup including the front electrode, of a diaphragm spanning and completely closing the casing aperture and means for tautening the diaphragm in its engagement with the aperture-margining-rib of the casing, and said diaphragm having a conical shell supported by and connected to its rear side which rearwardly extends to contact with the front electrode, and means for holding said member to such contact.

6. In a telephone transmitter, the combination with the casing having an apertured front and a resistance cup including a front electrode, having a forwardly projecting screw stud, of a diaphragm mounted in a taut condition between and connected with the portion of the casing marginally of its aperture and provided at its rear with a member connected therewith between its vibratory center portion and its casing engaging marginal portion and having a rearwardly converging formation with an aperture in the rear portion thereof through which said stud loosely protrudes, and a nut screw engaged in the stud for holding the rear portion of the apertured member in contact against the front electrode.

7. The combination with the casing of a telephonic instrument having an aperture in its front, and constructed with a rib marginally of said aperture of a diaphragm spanning and completely inclosing said aperture and extending across the front edge of said rib having a portion rearwardly turned to overlie the periphery of the rib and having an outturned marginal portion and a ring on said annular rib and engaging the outturned portion of the diaphragm.

8. The combination with the casing of a telephonic instrument having an aperture in its front constructed with a rib marginally of said aperture, of a diaphragm spanning and completely inclosing said aperture, extending across the front edge of said rib, having a portion rearwardly outturned to overlie the periphery of the rib and having an outturned marginal portion, and an annular member screw engaging the casing and having a portion thereof in tensioning engagement against the said outturned portion of the diaphragm.

9. A diaphragm for a telephonic instrument consisting of thin metal of disk shape having the portion adjacent its margin rearwardly turned and having its extreme marginal portion outwardly turned to constitute a step shaped flange for such diaphragm.

FELIX GOTTSCHALK.

Witnesses:
J. J. LOCKWOOD,
F. J. McADAMS.